Nov. 19, 1957  B. B. HOLMES  2,813,690
EMERGENCY OXYGEN SUPPLY SYSTEM
Filed March 7, 1952  2 Sheets-Sheet 1

INVENTOR.
BRADFORD B. HOLMES
BY
ATTORNEY

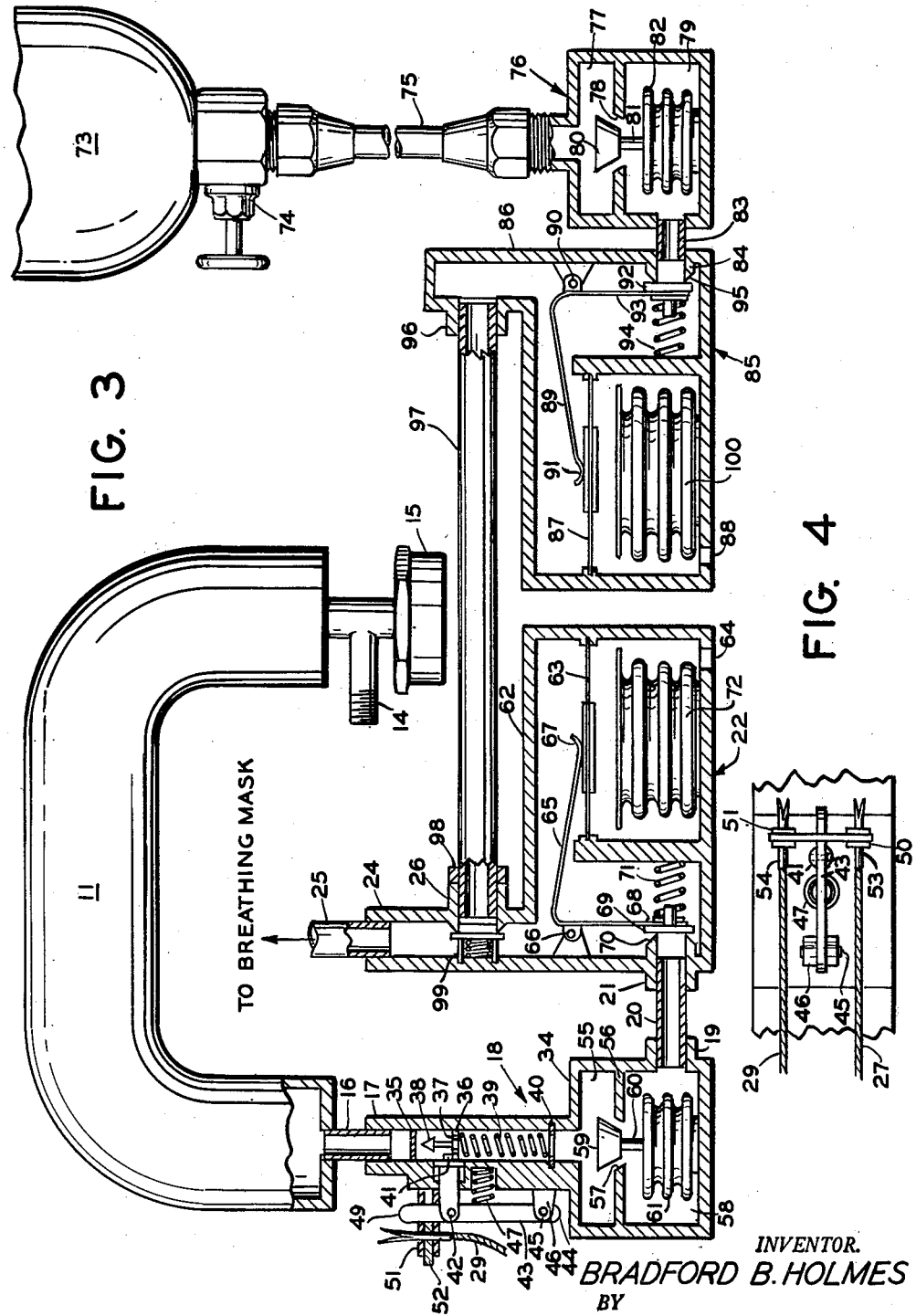

United States Patent Office 2,813,690
Patented Nov. 19, 1957

2,813,690

EMERGENCY OXYGEN SUPPLY SYSTEM

Bradford B. Holmes, New York, N. Y., assignor to Bendix Aviation Corporation, Teterboro, N. J., a corporation of Delaware Application March 7, 1952, Serial No. 275,395

8 Claims. (Cl. 244—122)

This invention relates generally to oxygen systems for supplying breathing oxygen to a pilot or occupant of an aircraft and more particularly is directed toward an emergency oxygen supply system of the above type.

In aircraft designed for high altitude flight, it has become common practice to provide the aircraft with an oxygen supply system for supplying breathing oxygen to the occupants, or pilot, of the aircraft during high altitude flight. The oxygen system usually comprises a bottle, or flask, containing compressed oxygen and an oxygen demand regulator that is mounted to the aircraft structure. A breathing mask worn by the pilot is adapted to be connected through a suitable flexible hose to the demand regulator to the end that in response to the respiration of the pilot the demand regulator operates to deliver a desired quantity of oxygen under a suitable pressure to the mask.

It has also become common practice in aircraft of the military type to provide means whereby the pilot or occupant, of the aircraft may be ejected from the aircraft under emergency conditions. To this end, the pilot's seat of the aircraft is mounted to a suitable mechanism which, upon operation, ejects the seat together with the pilot out of the aircraft. To accommodate the ejection of the pilot, the hose of the pilot's breathing mask is connected to the oxygen demand regulator by suitable quick-disconnect means that operate automatically to disconnect the hose from the regulator of the aircraft as the pilot is ejected.

Should emergency conditions occur at high altitude requiring the pilot to eject himself or "bail-out" from the aircraft, it is manifest that a supply of oxygen should be made available to the pilot in order to insure a safe parachute descent from the high altitude.

Therefore, the present invention contemplates and has for one of its objects, the provision of an auxiliary or emergency supply system of oxygen which is automatically made available to the pilot upon his ejection from the aircraft and which serves to supply breathing oxygen to the pilot during his parachute descent from a high altitude.

A further object of the instant invention is to provide an emergency supply of oxygen that is operable by the pilot to supply breathing oxygen to his mask in the event the main or regular oxygen supply of the aircraft is depleted or should it malfunction or fail.

The above and other objects and advantages of the instant invention will appear more fully hereinafter from a consideration of the following description taken in connection with the drawings wherein one embodiment of the instant emergency oxygen supply system is shown by way of example.

In the accompanying drawings wherein like reference characters designate like parts throughout the various views:

Fig. 3 is a schematic diagram of the instant invention and the regular or main oxygen supply of the aircraft; and Fig. 4 is a fragmentary side view of a portion of the actuating mechanism of the instant invention.

Figure 1:
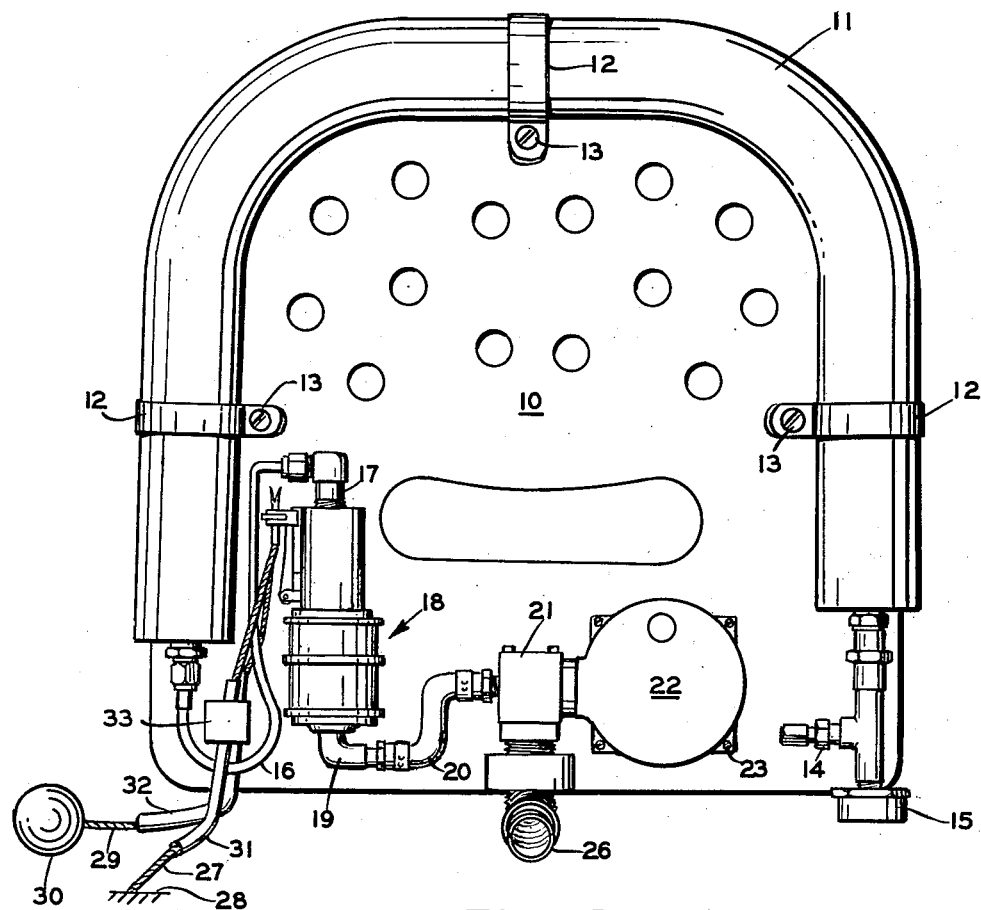
Fig. 1 is a plan view of the underside of an ejectable pilot's seat base showing the various elements of the emergency oxygen supply system contemplated herein mounted to the seat base.
Figure 2:
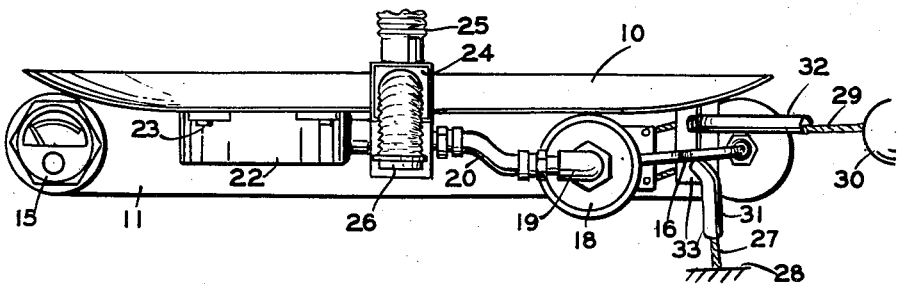
Fig. 2 is a front view of the seat base.

Referring now to the drawings, and more particularly to Figs. 1 and 2, the reference character 10 designates an ejectable pilot's seat base. The word "seat" in this field is subject to different interpretations. In the narrow sense it is the structure beneath the pilot on which he sits; but where that structure is attached to other cooperating elements forming a unit, such as a back, a head rest, supports and the like, the entire unit is often referred to as the "seat." In the preferred embodiment of this invention the oxygen supply elements are designed and arranged for mounting beneath and attached to the structure located under and supporting the pilot when sitting; and to avoid ambiguity this structure, often termed a seat, is here designated as a seat base.

A U-shaped tubular container 11 constructed to store a supply of oxygen under a high pressure is secured to the underside of seat base 10 by suitable straps 12 and fastening means such as screws 13. At one end, container 11 is provided with a conventional filler inlet assembly 14, whereby oxygen is introduced into container 11, and a pressure gauge 15 of standard design which serves to indicate the pressure of the oxygen therewithin. The other end of container 11 communicates through a suitable conduit 16 with the inlet 17 of a pressure reducer assembly 18. The outlet 19 of pressure reducer 18 communicates by way of a conduit 20 with the inlet 21 of a conventional oxygen demand regulator 22 that is mounted to the underside of seat 10 by suitable securing means such as screws 23. The outlet 24 of oxygen demand regulator 22 is adapted to receive the end of the inlet hose 25 of a conventional breathing mask, not shown. Outlet 24 of demand regulator 22 has connected thereto a branch inlet fitting 26 the purpose of which will hereinafter be explained.

As will hereinafter be more fully set forth, pressure reducer assembly 18 is normally closed and a lanyard 27 secured at one end to the aircraft structure 28 serves to actuate pressure reducer assembly 18 automatically upon ejection of seat base 10, and a lanyard 29 having a ball 30 at one end affords means for the manual operation thereof. Lanyards 27 and 29 are slidable within suitable tubular guide members 31 and 32, respectively, that are mounted in a bracket 33 secured by suitable means not shown, to the inside of seat base 10.

Referring now to Fig. 3, pressure reducer assembly 18 is shown as comprising a casing 34 having the inlet 17 and outlet 19 hereinbefore referred to. Inlet 17 has mounted therein a frangible disc 35 which serves to prevent flow from container 11 through reducer assembly 18 to demand regulator 22.

To provide means for shattering disc 35 a cylindrical member 36 having through openings 37 formed therein, is slidably mounted in inlet 17 and provided with a lance 38 which extends therefrom toward disc 35. A spring 39 operative between a snap ring 40 and member 36 biases member 36 and hence lance 38 in the direction of disc 35. Member 36 is held in a cocked position, wherein spring 39 is compressed, by means of a stop member 41. Stop member 41 in turn is connected by a pin 42 to a lever 43 that is pivotally mounted at one end 44 on a pin 45 which in turn is supported in brackets 46 secured to casing 34. A spring 47 operatively positioned in a recess formed in casing 34 engages lever 43 intermediate the pivotally mounted end 44 and the free end 49 thereof, urges lever 43 in a counterclockwise direction about pin 45. To maintain lever 43 in a position where stop member 41 engages member 36 and holes the same in cocked position, and to compress spring 47, casing 34 is provided with a pair of slotted brackets 50 and 51 that are disposed on either side of the free end 49 of lever 43. A cross bar 52 slidable in the slots of brackets 50 and 51 extends between the brackets. Registered openings in bracket 50 and in one end of bar 52 receive a pin 53 carried by lanyard 27 to secure that end of bar 52 to bracket 50, while registered openings in bracket 51 and the other end of bar 52 receive a pin 54 carried by lanyard 29 to secure the other end of bar 52 to bracket 51. The free end 49 of lever 43 is engaged beneath bar 52.

Due to the foregoing construction and arrangement, when lanyard 27 is pulled to thereby remove pin 53 from the registered openings in bracket 50 and bar 52, spring 47 acting through lever 43 rotates bar 52 about pin 54 thus freeing the end 49 of lever 43 and permitting lever 43 to pivot in a counterclockwise direction about pin 45 to the end that stop member 41 is removed from engagement with member 36. Spring 39 is now freed to move member 36 and lance 38 in the direction of frangible disc 35 to shatter the latter. Oxygen now flows from container 11 through inlet 17, and openings 37 in member 36 into the inlet chamber 55 of casing 34.

On the other hand, should lanyard 29 be pulled to remove pin 54 from engagement with bar 52 and bracket 51, spring 47 acts through lever 43 to rotate bar 52 about pin 53 to the end that lever 43 is free to pivot in response to the biasing effect of spring 47 to remove stop member 41 and thereby permit lance 38 to shatter disc 35 as aforesaid.

Thus, when either lanyard 27 or 29 is pulled, oxygen is permitted to flow from container 11 into inlet chamber 55 of pressure reducer assembly 18.

A transverse wall 56, in casing 34, is provided with an orifice 57 that communicates inlet chamber 55 with an outlet chamber 58 of pressure reducer assembly 18. A valve member 59 adapted to coact with orifice 57 to control the flow of oxygen therethrough is operatively connected by a stem 60 to a pressure responsive bellows 61 mounted in outlet chamber 58. Bellows 61 in response to the pressure of the oxygen in outlet chamber 58 operates in a manner well known in the art to move valve member 59 relative to orifice 57 so as to maintain a preselected pressure of oxygen in outlet chamber 58 which is available at outlet 19.

From the foregoing description of the operation of pressure reducer assembly 18 it is apparent that it serves in two capacities in that it serves as a normally closed valve to prevent flow from container 11 to demand regulator 22 and after actuation by either lanyard 27 or 29 it serves to reduce the pressure of the oxygen delivered from container 11 to demand regulator 22.

As hereinbefore set forth, outlet 19 of pressure reducer assembly 18 communicates by way of conduit 20 with the inlet 21 of a conventional oxygen demand regulator 22 having an outlet 24 adapted to receive the hose 25 of the pilot's breathing mask.

As shown schematically in Fig. 3, demand regulator 22 includes a casing 62 having a respiratory responsive diaphragm 63 mounted therein. One side of diaphragm 63 is exposed to atmosphere through an opening 64 in casing 62 to the end that diaphragm 63 is movable in response to inhalations and exhalations of the pilot sensed through hose 25. A lever 65 pivotally mounted as at 66 within casing 62, is engaged at one end 67 with diaphragm 63, while the opposite end 68 thereof is connected to a valve member 69 that is adapted to engage a valve seat 70 formed on inlet 21. A spring 71 normally urges valve member 69 into engagement with its coacting seat 70 to close communication through inlet 21. In response to inhalations of the pilot, diaphragm 63 moves lever 66 in a counterclockwise direction thereby moving valve member 69 away from seat 70 against the bias of spring 71 to permit flow through inlet 21. When the inhalation ceases, spring 21 returns valve 69 to its seat 70 to prevent further flow through inlet 21.

Demand regulator 22 also includes an atmospheric pressure responsive bellows 72 which, in response to altitude, operates in a manner well known in the art, to move diaphragm 63 and control valve 69 so as to provide pressure breathing in the pilot's mask.

The elements thus far described constitute a complete oxygen system that is adapted to be mounted to the underside of an ejectable pilot's seat base and which is available to supply oxygen to the pilot's breathing mask in an emergency. Thus, in the event the ejection mechanism of the aircraft is operated to eject the pilot and seat base 10, lanyard 27 being secured to aircraft structure 28 will operate so as to remove pin 53. On the other hand, if the pilot manually pulls on knob 30, lanyard 29 will remove pin 54. In either event, spring 47 operates to pivot lever 43 in a counterclockwise direction to thereby remove stop member 41 from engagement with member 36. Spring 39, therefore, drives member 36 and lance 38 toward and through disc 35 to shatter the same and permit oxygen to flow from container 11 into pressure reducing assembly 18. Pressure reducing assembly 18 serves to reduce the pressure of the oxygen to a desired value and conduit 20 serves to deliver the oxygen at this pressure to inlet 21 of oxygen demand regulator 22 where it is made available through outlet 24 and hose 25 to the pilot in response to his breathing.

As further shown schematically in Fig. 3, the main or regular oxygen supply system of the aircraft comprises a tank or bottle 73 of compressed oxygen having a valve 74 controlling the flow of oxygen from bottle 73 through a suitable conduit 75 into a pressure reducing assembly 76. Pressure reducing assembly 76 includes an inlet chamber 77 that communicates through an orifice 78 with an outlet chamber 79. A valve member 80 operably connected by a stem 81 to a pressure responsive bellows 82 mounted in outlet chamber 79 is moved relatively to orifice 78 by bellows 82 so as to control the flow of oxygen into outlet chamber 79 and to maintain the oxygen within the latter chamber at a predetermined value. Outlet chamber 79 communicates by way of a conduit 83 with the inlet 84 of a conventional oxygen demand regulator 85 which may be similar in construction to demand regulator 22. Thus, regulator 85 includes a casing 86 having a respiratory responsive diaphragm 87 mounted therein that is placed in communication with atmosphere at one side thereof by means of an opening 88 formed in casing 86. A lever 89, pivoted as at 90, engages diaphragm 87 at one end 91 and is connected to demand valve member 92 at the other end 93 thereof. Demand valve member 92 is urged by a spring 94 into engagement with a valve seat 95 to close inlet 84. Casing 86 is also provided with an outlet 96. A suitable conduit 97 connected at one end to outlet 96 is secured by a quick-disconnect fitting 98 of any type well known in the art, to the branch inlet 26 of outlet 24 of demand regulator 22. Inlet 26 is provided with a check valve 99 of conventional design which opens inwardly in the direction of outlet 24. Demand regulator 85 is further provided with an atmospheric pressure responsive bellows 100 which serves to actuate diaphragm 87, in a manner well known in the art, to provide for pressure breathing in the pilot's mask at high altitudes.

Due to the foregoing arrangement, hose 25 of the pilot's breathing mask is also placed in communication with diaphragm 87 of demand regulator 85 to the end that under normal conditions, oxygen is supplied to the pilot's breathing mask from bottle 73, in response to the operation of demand regulator 85 by the pilot's breathing.

It will be apparent to one skilled in the art that under normal conditions oxygen is supplied from bottle 73 to pressure reducing assembly 76 which serves to deliver the oxygen at a desired pressure to the inlet 84 of demand regulator 85. In response to inhalations of the pilot, check valve 99 opens inwardly and diaphragm 87 moves lever 89 to move valve member 92 away from its coacting seat 95 to thereby permit oxygen to flow through inlet 84, outlet 96, conduit 97, branch inlet 26, past check valve 99 into outlet 24 of regulator 22 to be delivered through hose 25 to the pilot's breathing mask. When the pilot ceases to inhale, spring 94 returns valve member 92 to its seat 95 to close inlet 84, and check valve 99 moves to its closed position.

In the presence of emergency conditions, for example, should the supply of oxygen in the normal system fail, the pilot by pulling on knob 30 actuates lanyard 29 to remove pin 54, thereby initiating the operation hereinbefore set forth and providing for the flow of oxygen from auxiliary or emergency container 11 to hose 25. On the other hand, if the emergency conditions warrant the ejection of the pilot, upon actuation of the ejection mechanism, the subsequent ejection of seat 10 disconnects conduit 97 from inlet 96 and lanyard 27 removes pin 53. Oxygen then flows as above set forth through the emergency system to the pilot's breathing mask during his parachute descent.

Having thus described the details of construction and arrangement of the instant invention, it will be apparent to one skilled in the art that the various objects of the present invention hereinbefore set forth have been achieved. Moreover, it will be apparent to those skilled in the art that other types of pressure reducing units and oxygen demand regulators may be utilized to carry out the function thereof hereinbefore set forth and that various changes in the design and arrangement of the parts may be made without departing from the scope of the invention.

What is claimed is:

1. An emergency oxygen supply system for aircraft having an ejectable pilot's seat including a base, and a normal oxygen supply carried by the aircraft, comprising the combination therewith of an emergency oxygen supply mounted on the seat base, a mask connecting member carried by the seat base and having a feed connection to said emergency supply and a quick detachable feed connection to the normal oxygen supply, and releasable normally closed means for preventing oxygen flow from the emergency supply through said connection to said first mentioned connection to said mask connecting member.

2. An oxygen supply system as claimed in claim 1 in which said quick detachable feed connection includes a check valve.

3. An emergency oxygen supply system for aircraft having an ejectable pilot's seat and a normal oxygen supply, including an oxygen supply container, a pressure reducer and a normal demand regulator connected in series, comprising the combination therewith of an emergency oxygen supply container, an emergency pressure reducer and an emergency demand regulator connected in series and mounted on the seat, a common mask connection member having a feed connection to both demand regulators, the connection to the normal demand regulator being of the quick detachable type, and releasable means for preventing oxygen flow from the emergency container to the mask connection member under normal conditions.

4. An emergency oxygen supply system for aircraft having an ejectable pilot's seat including a base, comprising an emergency oxygen supply container carried by the seat base, a mask connection member carried by the seat base and having a feed passage connected to said container, and releasable means for preventing oxygen flow through said passage to said member, including a flow releasing unit, means for actuating said unit to release the flow, including an actuating spring, latch means normally holding said spring in inoperative position, and means operated upon ejection of the seat by a connection to the aircraft to release the latch means and activate the spring.

5. An oxygen supply system as claimed in claim 4, in which the means for actuating said unit includes separate manually operable means.

6. An emergency oxygen supply system for aircraft having an ejectable pilot's seat including a base, comprising an emergency oxygen supply container carried by the seat, a mask connection member carried by the seat base and having a feed passage connected to said container, and releasable means for normally preventing oxygen flow through said passage to said member, including a flow releasing unit and means for actuating said unit, including an automatic release device mounted on the base and having a connection for a lanyard attached to the aircraft, and a separate manual release device having a connection for a manually operable lanyard.

7. An emergency oxygen supply system for aircraft having an ejectable pilot's seat including a base, comprising an emergency oxygen supply container carried by the seat base, a mask connection member carried by the seat base and having a feed passage connected to said container, and releasable means for normally preventing oxygen flow through said passage to said member, including a latch having two separate releases, one arranged for automatic operation upon ejection of the seat and one arranged for manual operation.

8. An emergency oxygen supply system for an aircraft having an ejectable pilot's seat including a base, comprising an emergency oxygen supply container carried by the seat base, a mask connecting member carried by the seat base and having a passage connected to said container, a normal oxygen supply connected to said mask connecting member, and releasable means mounted on the seat base for normally preventing oxygen flow through said passage, comprising a sealed frangible partition extending across the passage, a partition fracturing element in the passage movable into fracturing engagement with the partition, a spring biasing said element toward the partition, and a releasable latch normally restraining said element from engagement with the partition.

References Cited in the file of this patent

UNITED STATES PATENTS

| 1,298,500 | Hardel | Mar. 25, 1919 |
| 2,384,669 | Fields | Sept. 11, 1945 |
| 2,523,906 | Holmes | Sept. 26, 1950 |
| 2,583,502 | Wiggins | Jan. 22, 1952 |
| 2,602,608 | Darling | July 8, 1952 |

FOREIGN PATENTS

| 501,236 | Great Britain | Feb. 20, 1939 |

OTHER REFERENCES

Exit in Extremis, Flight Magazine, pp. 199–201, August 19, 1948.